US006948685B2

(12) United States Patent
Hawthorne

(10) Patent No.: US 6,948,685 B2
(45) Date of Patent: Sep. 27, 2005

(54) LOCKING DEVICE WITH SOLENOID RELEASE PIN

(75) Inventor: Dana D. Hawthorne, Valencia, CA (US)

(73) Assignee: HR Textron, Inc., Santa Clarita, CA (US)

( * ) Notice: Subject to any disclaimer, the term of this patent is extended or adjusted under 35 U.S.C. 154(b) by 14 days.

(21) Appl. No.: 10/695,500

(22) Filed: Oct. 27, 2003

(65) Prior Publication Data

US 2005/0103926 A1 May 19, 2005

(51) Int. Cl.[7] .................................................. B64C 9/02
(52) U.S. Cl. ............................... 244/129.1; 244/137.4; 244/3.27; 89/1.58
(58) Field of Search ............................ 244/3.27, 137.4, 244/129.1; 292/252; 403/6; 49/31; 89/1.51, 89/1.54, 1.58

(56) References Cited

U.S. PATENT DOCUMENTS

| | | | | |
|---|---|---|---|---|
| 2,139,193 A | * | 12/1938 | Lamothe et al. | 292/252 |
| 2,255,695 A | * | 9/1941 | Bull | 403/6 |
| 3,753,316 A | * | 8/1973 | Savarieau et al. | 49/31 |
| 3,985,213 A | | 10/1976 | Braggins | |
| 4,120,232 A | * | 10/1978 | Hoffman, Jr. | 89/1.51 |
| 4,289,039 A | | 9/1981 | Trunner et al. | |
| 4,441,674 A | * | 4/1984 | Holtrop | 244/137.4 |
| 4,523,731 A | | 6/1985 | Buitekant et al. | |
| 4,565,183 A | | 1/1986 | Smith | |
| 5,216,909 A | | 6/1993 | Armoogam | |
| 5,600,977 A | | 2/1997 | Piron | |
| 5,611,223 A | * | 3/1997 | Spitzer | 70/58 |
| 5,628,216 A | | 5/1997 | Qureshi et al. | |
| 6,074,140 A | | 6/2000 | Cook | |
| 6,224,013 B1 | * | 5/2001 | Chisolm | 244/3.27 |

OTHER PUBLICATIONS

Pivot Point, Inc., Positive Lock Pins, web page, 2003, 2 pages, Hustisford, WI 53034.

* cited by examiner

*Primary Examiner*—Galen Barefoot
(74) *Attorney, Agent, or Firm*—David E. Huang, Esq.

(57) ABSTRACT

A locking device with a solenoid release actuator includes a housing, a plunger axially slidable within the housing, a biasing member for biasing the plunger in a first direction, one or more locking balls, and the locking balls disposed in an aperture in the housing, the plunger having a portion thereof containing at least one recess for receiving the balls, a member to be locked being held in a first locked position with the plunger in a first locking position and the balls in a radially outward position, the plunger being positioned axially such that the recesses therein are not in alignment with the apertures, and a solenoid coil disposed in the housing around the plunger, for inducing a magnetic force to move the plunger against the biasing member such that the recesses align with the apertures and the balls are movable radially inward into the recesses thereby releasing the locked member. In another embodiment, a bomb, missile or torpedo having a head and tail and fins proximate the tail biased into a retracted position, incorporates such a locking device for maintaining the fins in the retracted position, and for releasing the fins upon solenoid actuation. The locking device may be tested and reset, as desired.

21 Claims, 9 Drawing Sheets

LOCKING DEVICE WITH SOLENOID RELEASE PIN

BACKGROUND OF THE INVENTION

The present invention relates to a locking device. In various environments, especially for flight vehicles and projectiles, it is necessary to quickly and reliably release structural members for deployment yet securely hold such members in a retracted position for storage, transportation, or other pre-deployment requirements.

In certain applications such as smart bombs with movable fins (for guidance), missiles with movable fins, and satellite or space vehicles and equipment with deployable panels (e.g., solar panels), it is desirable to provide a large margin of safety in design. For such situations, the fins or panels are biased towards their deployment position with a large force, often a spring force. This force must be securely and reliably held in place prior to deployment. Premature deployment could easily damage the fins or panels, or cause other problems. Failure to deploy could result in an errant bomb or missile, or a satellite's premature loss of power.

In one proposed smart bomb design, a pin supported by plastic holds a first spring-biased member in place, which through mechanical linkage holds torsion springs in place. Mechanical linkage helps reduce the force to about 200 to 300 pounds needed to hold the spring-biased member in the locked position. When the pin is released, the torsion springs will cause the fins to be unlocked and thus deployed. To obtain a quick release, a predetermined amount of explosive is ignited to break the plastic, thereby, releasing the pin.

Another system to release a locking element or pin as used in airborne vehicles and projectiles includes cutting a bolt, which holds two elements relative to each other, so as to release satellite photovoltaic panels and antenna reflectors. A further system involves weakening a nut, e.g., by cutting a portion of the nut, then exploding the nut at the time of deployment. These systems all involve destruction, and are thus cumbersome and expensive to handle, test and replace.

In U.S. Pat. No. 6,224,013 to Chisolm, a tail fin deployment device uses lock balls to hold a cup member that in turn through linkage holds tail fins in a retracted position. A pin having recesses is spring-biased so that the recesses are in alignment with the apertures holding balls, but the pin is held by a lanyard in a position where its recesses are out of alignment with the balls. The lanyard is tied to the aircraft, so when the bomb is released, the lanyard comes out. Even in this design, the lanyard has to be pulled so as to overcome about 300 pounds of force from a spring. Moreover, this design necessitates hooking the lanyard to the aircraft.

Locking balls and the like have been used in various devices, such as manual positive lock pins, e.g., made by Pivot Point, Inc. of Hustisford, Wis. Pressing down on a button pushes a pin so as to align a recess in the pin with locking balls. When aligned, the balls enter the recess and release a locked member.

U.S. Pat. No. 6,074,140 to Cook secures a drill bit in place with a lock ball chuck. It is stated that a mechanical, solenoid or manual chuck may be used although no actual structure is shown.

U.S. Pat. No. 4,523,731 to Buitekant et al. uses a manual pull pin to release a plunger in turn releasing lock balls. The lock balls hold a flight vehicle to an external storage element. This manual release is disclosed as an alternative to the explosive severing of a bolt that held the flight vehicle and storage element together in a prior design.

U.S. Pat. No. 5,216,909 to Armoogam discloses an electromechanical locking mechanism for selective operation of a latch. A solenoid is used to push a pin down which pushes down a bolt locking pin, enabling movement of a piston transverse to the bolt locking pin.

Other patents using various locking mechanisms include U.S. Pat. No. 3,985,213 to Braggins, U.S. Pat. No. 5,628,216 to Qureshi et al., U.S. Pat. No. 4,289,039 to Trunner et al., U.S. Pat. No. 5,600,977 to Piron, and U.S. Pat. No. 4,565,183 to Smith.

SUMMARY OF THE INVENTION

In one embodiment, there is a locking device with a solenoid to actuate release of the lock. The locking device includes a housing with a solenoid and a metal or magnetically responsive element disposed proximate or within a coil or coils of the solenoid. The responsive element (such as a plunger) is spring biased into its locked position. In such position, a lower portion of the responsive element (plunger) holds one or more balls, for example ball bearings, in a position where they protrude from the housing. In turn, the ball or balls hold a further element in a locked position. The portion of the magnetically responsive element (e.g., the bottom of the plunger) holding the balls has a recess or recesses proximate but not in alignment with the ball or balls when in the locked position.

Actuating the solenoid by sending current through the coils moves the plunger, by an induced magnetic field, against the bias of the spring to a release position. In the release position, the recess or recesses of the bottom portion of the plunger receive the ball or balls. The balls no longer protrude from the housing, and thereby release the lock on the element being held. This locked or held element may also be biased, e.g., spring biased to move when the lock balls are released. The locked element when released may activate, directly or in conjunction with various linkage or components, the deployment of fins, such as fins for a smart bomb, missile, or torpedo. The released member may also activate or deploy solar panels for a satellite, or other member, especially for airborne use, but may include other uses as well.

In other embodiments, the device may use a lever in place of a ball or balls, it may use staged or staggered releases, and/or it may release multiple balls at once.

DESCRIPTION OF THE PREFERRED EMBODIMENT(S)

Figure 1:
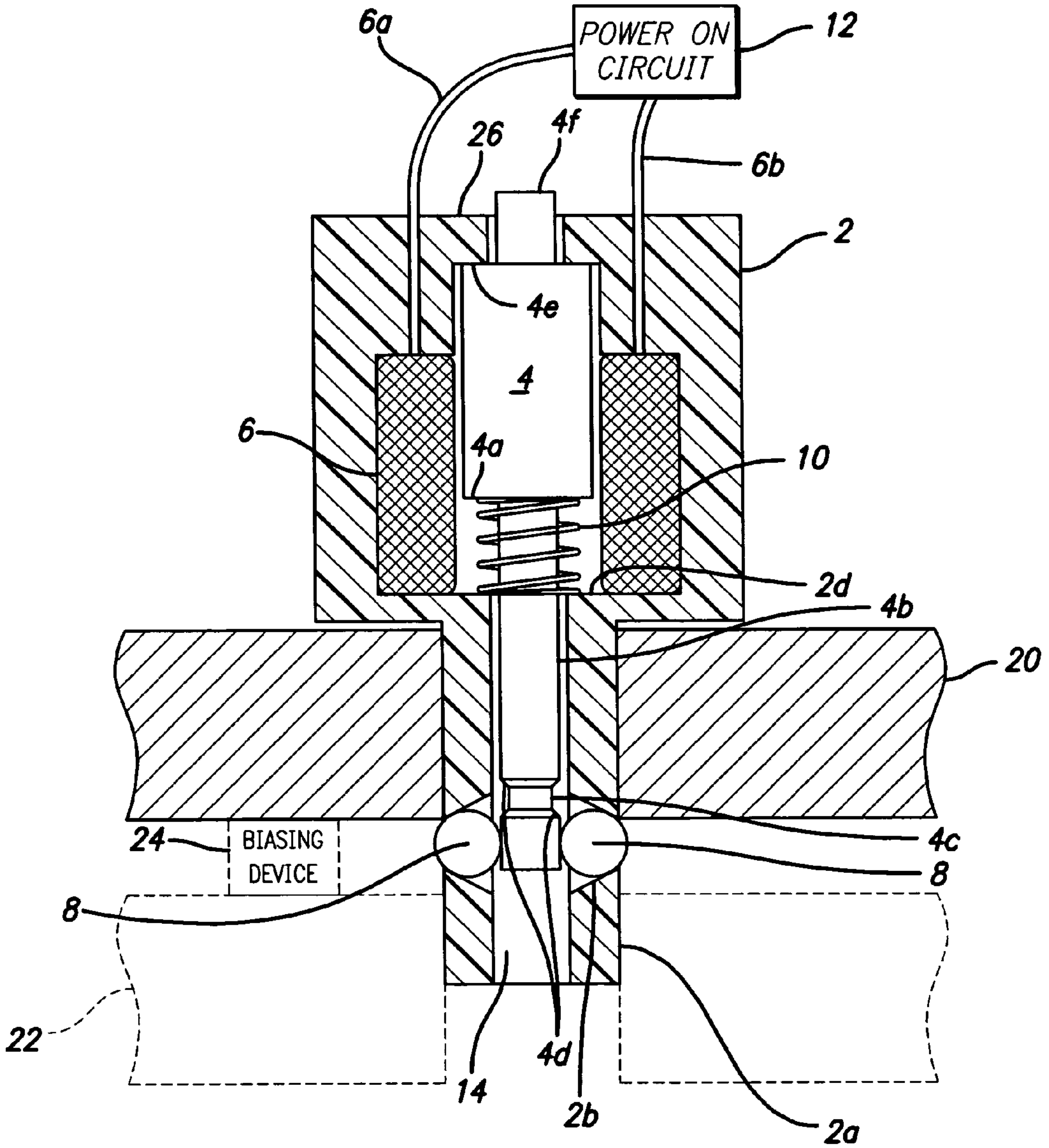
FIG. 1 is a partial sectional view of a locking device in a locked position in accordance with a first embodiment of the invention.

A locking device with a solenoid-actuated release pin in accordance with a first embodiment of the invention is shown in FIG. 1. The device has a housing 2, which may be a nonconductive material such as plastic, or may be conductive. The device also has a metal or otherwise magnetically responsive plunger or pin 4 axially slidable with respect to the housing, a magnetic coil 6 fixed to the housing 2 (e.g., by bolting), two locking balls 8, a biasing member 10, for example a compression spring, to bias plunger 4 in a first direction, and a power on circuit 12, typically including a battery or other electrical power source, a switch or circuit to turn on the power, and a capacitor and/or a resistor connected to the coil 6, e.g., by wires 6*a*, 6*b*.

Plunger 4 has a surface 4*a* against which biasing member 10 presses. Plunger 4 also has a shaft 4*b* with a recess or groove 4*c*, preferably with chamfered or beveled edges 4*d*. Shaft 4*b* is slidably fit within a cylindrical chamber 14 defined by a lower portion 2*a* of housing 2. Lower portion 2*a* of housing 2 has two chamfered or beveled apertures 2*b* defined therein where balls 8 are disposed.

When plunger 4 is in its locking position (the up position in FIG. 1), upper surface 4*e* of plunger 4 presses against the inside surface 2*d* at the top of housing 2, and a non-recessed portion of shaft 4*b* is adjacent balls 8 holding them in a radially outward position (locking position) as shown in FIG. 1. In this position, an element 20 is held in a locked or storage position, thus being prevented from moving. Accordingly, element 20 may be held in place against external forces such as inertial and surface or contact forces (downward in FIG. 1) acting on it. Such external forces may include, for example, those exerted by gravity, an airstream, water or other biasing device such as a spring, one or more magnets, or the like. Typically, in airborne devices and projectiles, the external forces that are present may be quite high. To counter such external forces for airborne devices and projectiles in certain embodiments, the biasing force of spring 10 on plunger 4 may be about 150 pounds to about 200 pounds, e.g., 185 pounds or even higher than 200 pounds.

In a preferred embodiment, element 20 has a recess or aperture formed therein to provide space to locate the lower portion 2*a* of housing 2, the shaft 4*b* of plunger 4, and the locking balls 8. Together biasing member 10, solenoid 6, locking balls 8 and plunger 4 provide a way to reduce the force necessary to initiate deployment (e.g., of fins, panels or other devices) down to the order of a few pounds or even ounces of force.

Accordingly, in a preferred embodiment, the spring 10 has a spring force of about a pound or just ounces, and thus the solenoid need only overcome a force of about a pound or just ounces.

When circuit 12 is turned on, current flows to coil 6 inducing a magnetic field (as is well known in the art of solenoids), to move the plunger 4 downward in FIG. 1. The magnetic force is preferably sufficiently strong to overcome the force of biasing member (e.g., a spring) 10. Shaft 4*b* moves such that recess 4*c* moves adjacent to balls 8, which roll or fall into the recess. The portions of balls 8 protruding beyond housing 2 no longer protrude or protrude relatively little, so as to release the member 20 from the locking device allowing it to move downward by gravity, and/or biasing device 24. Device 24 acts on member 20 pulling (or pushing) it in the downward direction in FIG. 1. Alternatively, biasing device 24 acts on a member 22 pulling (or pushing) it in the upward direction in FIG. 1.

Device 24 may be located above or below the member 20 or 22, as desired. The biasing device's actual location, depends on the type of device, e.g., tension spring, compression spring, other spring, resilient member, or otherwise, and depends on the position of the member 20 (or 22) that is locked, and will be evident to one of ordinary skill in the art. While two locking balls are shown, any number from one or more may be used.

Figure 2:
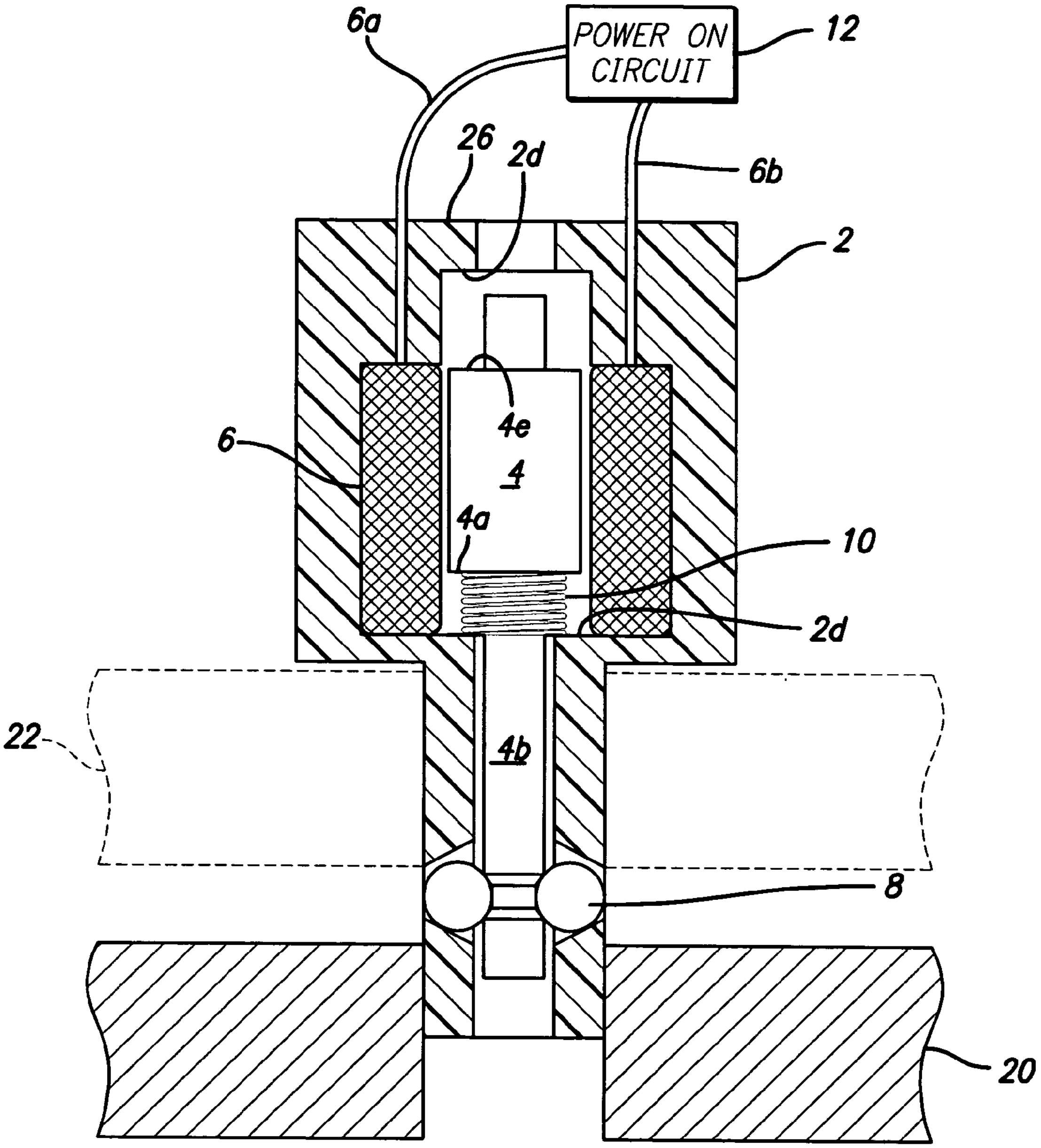
FIG. 2 is a view similar to FIG. 1 but in a released position.

FIG. 2 shows the position of the locking device in the released position and with the biasing device omitted for simplification. Release occurs by sending electrical current through the coils to induce a magnetic field acting on the plunger in a direction (e.g., downward in FIGS. 1 and 2) opposite to the direction that the spring biases the plunger (e.g., upward in FIGS. 1 and 2). The magnetic force is sufficient to overcome the spring force (e.g., greater than about a pound or just ounces) to move the plunger down sufficiently so that the recess aligns with the apertures. The balls will then enter the recess and no longer retain the member 20 (or 22) that was locked. The greater the solenoid's force, the faster the spring force will be overcome. Accordingly, the solenoid must be designed taking into account the spring force, and the desired speed of release of the locked member.

Button 4*f* (FIG. 1) may provide for manually pressing plunger 4 down to manually release the balls 8 and test the locking device. Button 4*f* preferably projects above outer surface 26 of housing 2 when the plunger is in the locked position.

Figure 3:
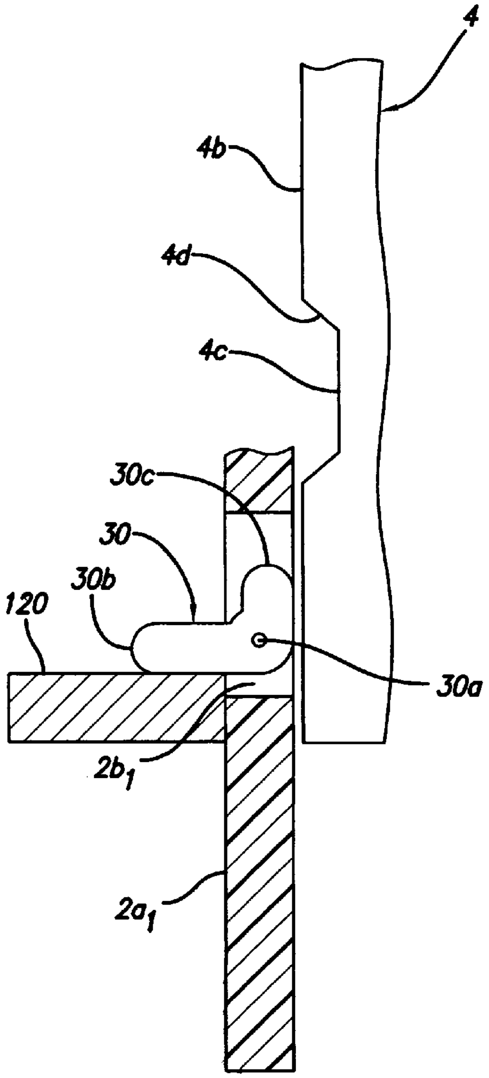
FIG. 3 is a view similar to a portion of FIG. 1 and showing a second embodiment of the invention using a lever valve in a locked position.

FIG. 3 shows a portion of plunger 4 having the recess 4*c*, but each locking ball is replaced with a lever 30. Lever 30 is rotatable on a pivot pin 30*a*, and may be rotationally biased by a torsion spring (not shown), e.g., in a clockwise direction in this embodiment. The lever has a locking arm 30*b* for holding a locked member 120 in place. Locked member 120 may be positioned the same as member 20 or member 22 of FIGS. 1 and 2, as desired. The lever 30 also has a release arm 30*c* for rotating into recess 4*c* when solenoid coil 6 (FIGS. 1 and 2) is activated by power on circuit 12 to move plunger 4 down sufficiently so that recess 4*c* aligns with arm 30*c*, allowing arm 30*c* to rotate (clockwise in FIG. 4) into the recess.

Figure 4:
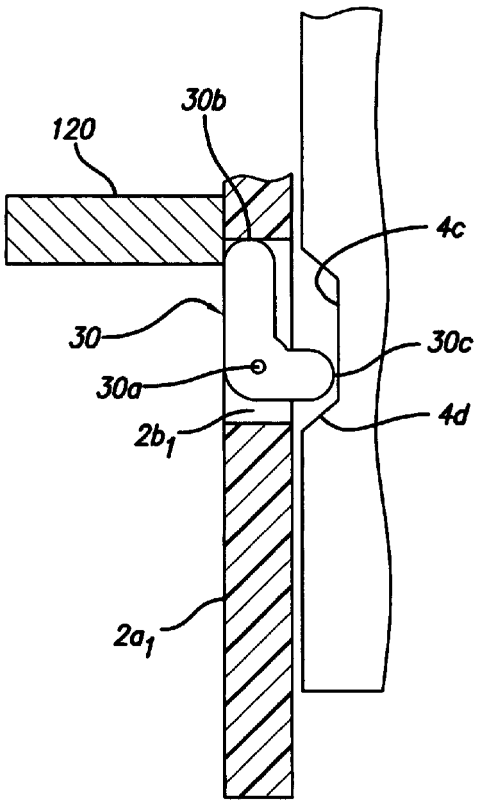
FIG. 4 is a view similar to FIG. 3 but in a released position.

Because the lever rotates, the locked member 120 is locked against upward motion in this embodiment as shown in FIGS. 3 and 4. If the lever were oriented so that arm 30*c* points down in FIG. 3, and the lever were of a type that rotates counterclockwise, the locked member 22 (FIGS. 1 and 2) may be locked against downward movement. The location of pivot pin 30*a* would be moved upward, and the plunger and solenoid would ideally be positioned so that the recess 4*c* is below apertures $2b_1$ in the locked position, and so that the plunger is biased downward by a spring. The solenoid when activated moves the plunger upward so that the recesses 4*c* will align with apertures $2b_1$ in lower housing $2a_1$. In this way when the plunger is reset, its upper beveled edge will push on arm 30*c* rotating the lever clockwise to position it in the locking position.

In FIGS. 3 and 4 as shown, the plunger must move down to align the recess and apertures. When the device is set or reset to the locked position, the plunger must be moved upward so that lower beveled surface 4*d* rotates arm 30*c* counterclockwise against the torsion spring bias to put the lever back into the locking position.

Figure 5:
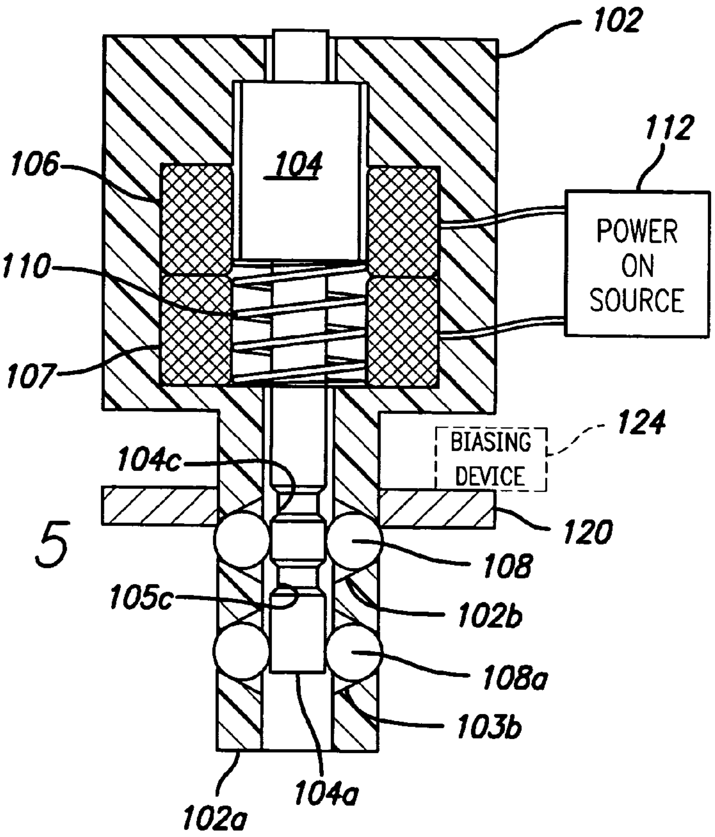
FIG. 5 is a view similar to FIG. 1 of a third embodiment of the invention using a staggered release and in a locked position.
Figure 6:
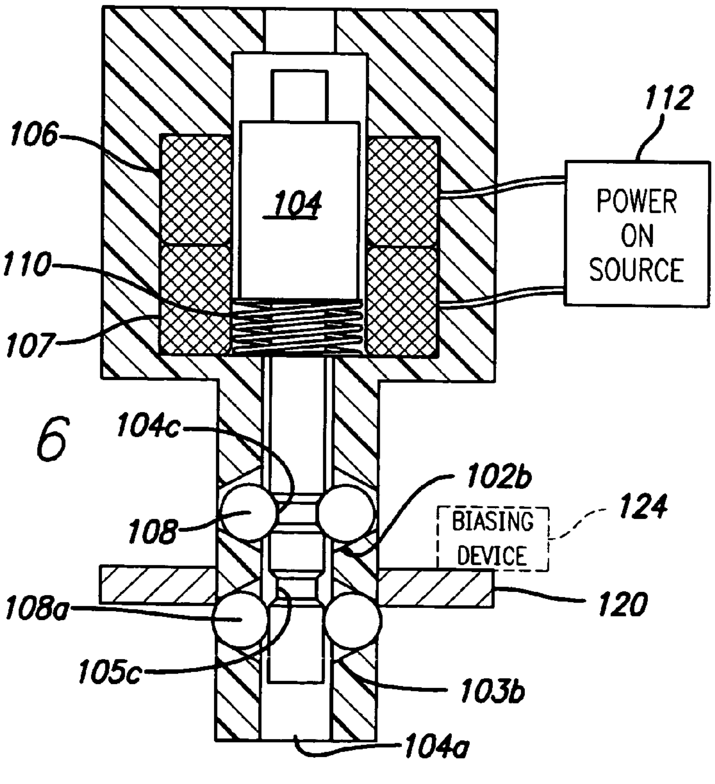
FIG. 6 is a view similar to FIG. 5 but in a first released position.
Figure 7:
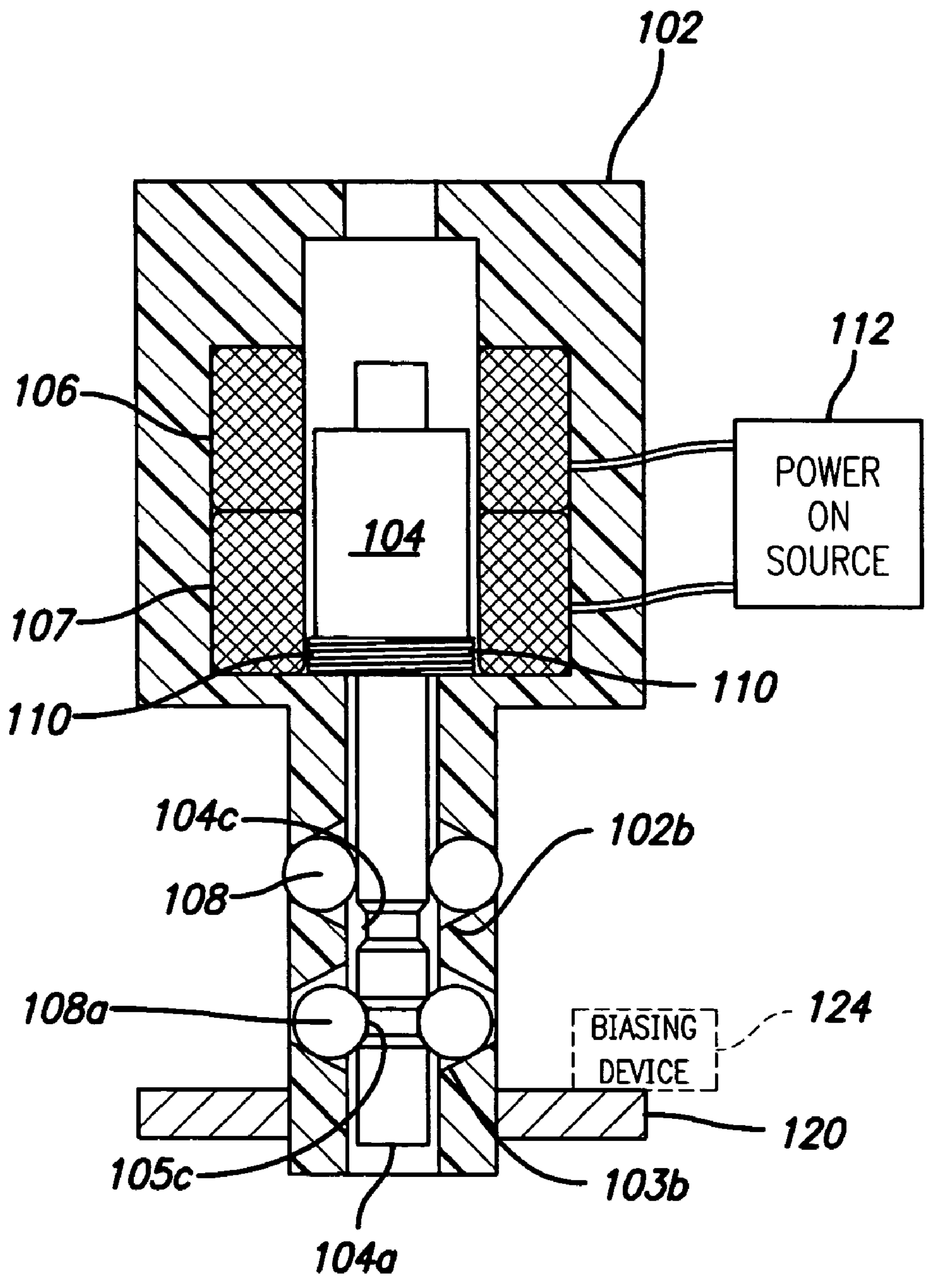
FIG. 7 is a view similar to FIG. 5 but in a second fully released position.

In another embodiment, a staggered release may be achieved, as shown in FIGS. 5 to 7. In FIG. 5, a housing 102 holds a plunger 104 biased upward by a spring 110. Two solenoid coils 106, 107 may be successively activated by power on source 112. When the first solenoid coil 106 is activated, plunger 104 moves partway down such that a first recess 104*c* in the plunger aligns with a first set of balls 108, partially releasing locked member 120. Biasing member 124 pushes (or pulls) locked member 120 downward until it is stopped by a second set of balls 108*a*, as shown in FIG. 6.

When second solenoid coil 107 is activated, plunger 104 moves down to the position shown in FIG. 7, where the second recess 105*c* is aligned with a second set of apertures 103*b*, such that second set of balls 108*a* move radially inward and this fully releases locked member 120.

Figure 8:
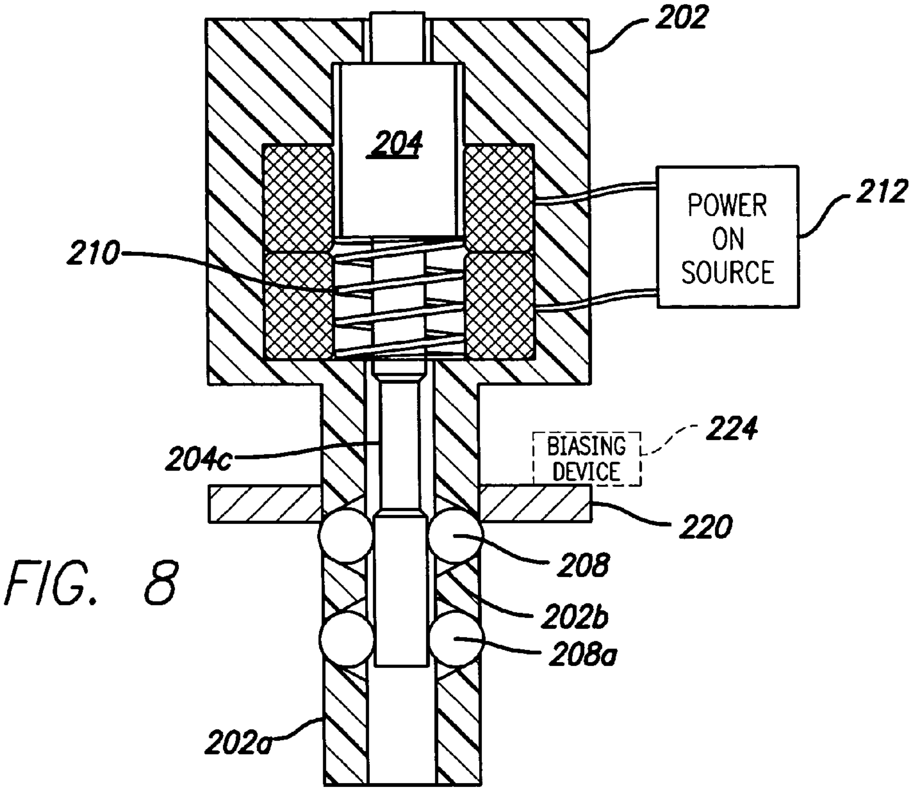
FIG. 8 is a view similar to FIG. 5 but of a fourth embodiment in a locked position.
Figure 9:
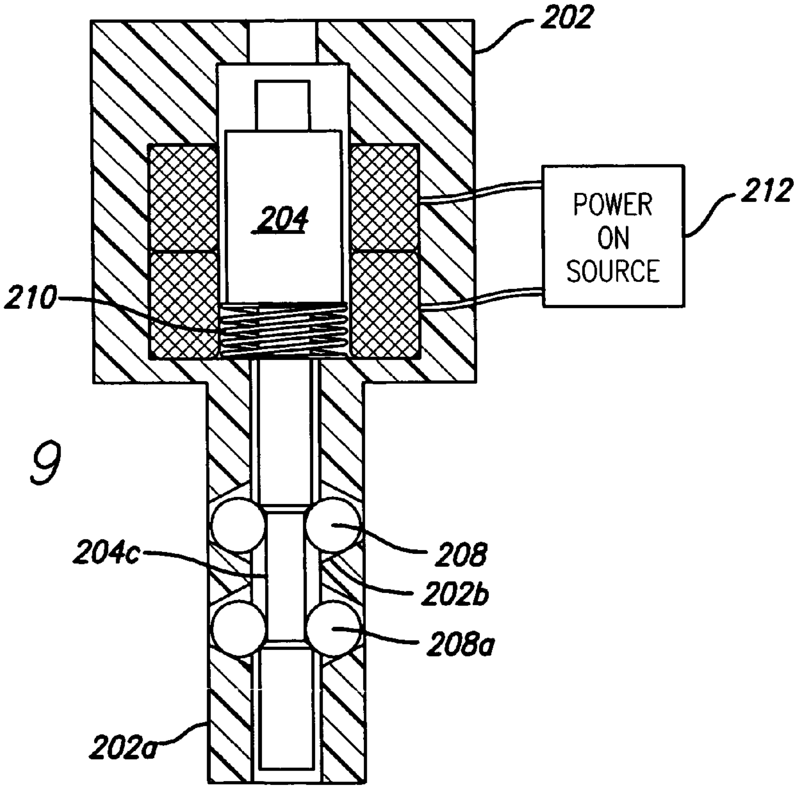
FIG. 9 is a view similar to FIG. 8 but in a released position.

FIGS. 8 and 9 show a variation of the previous embodiment, where two sets of balls 208, 208*a* are released substantially simultaneously due to the plunger having one elongated recess 204*c*. Recess 204*c* is sufficiently long so that both sets of balls can enter recess 204*c*. There still may be a slight staggering effect to the release of the first and second sets of balls and therefore a slight staggering to the release of locked member 220 under the influence of biasing member 224, although depending on the speed with which the solenoid pushes the plunger down, this slight staggering may or may not be significant, as desired by the designer.

Figure 11:
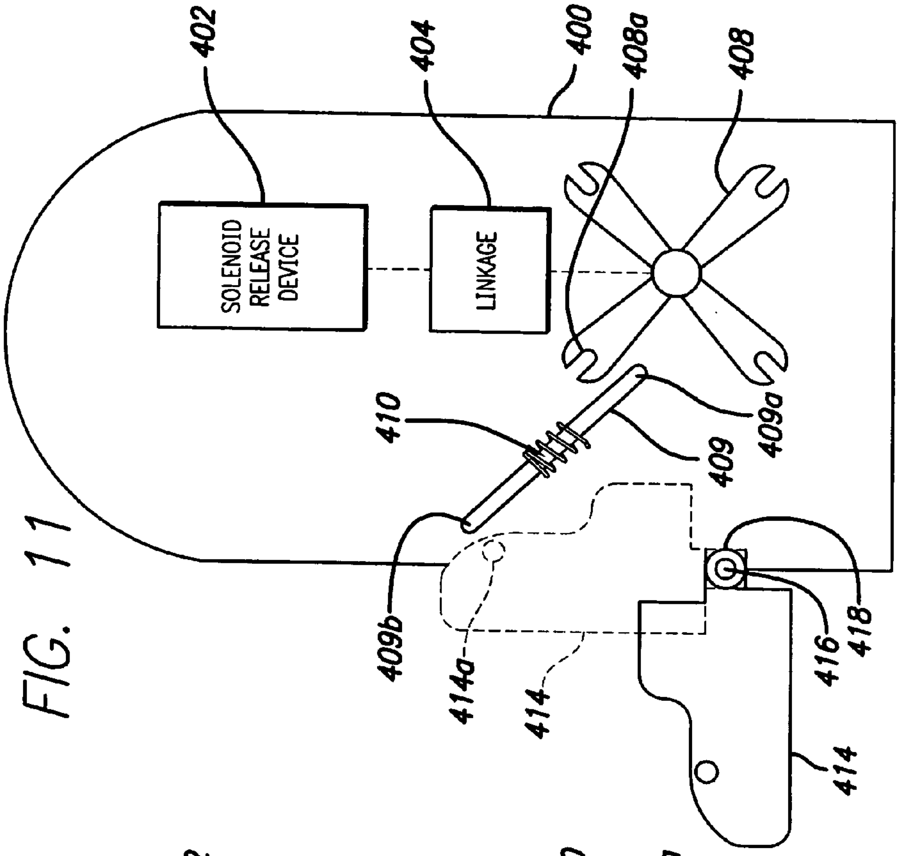
FIG. 11 is a view similar to FIG. 10, but with the fins released and thereby deployed.
Figure 10:
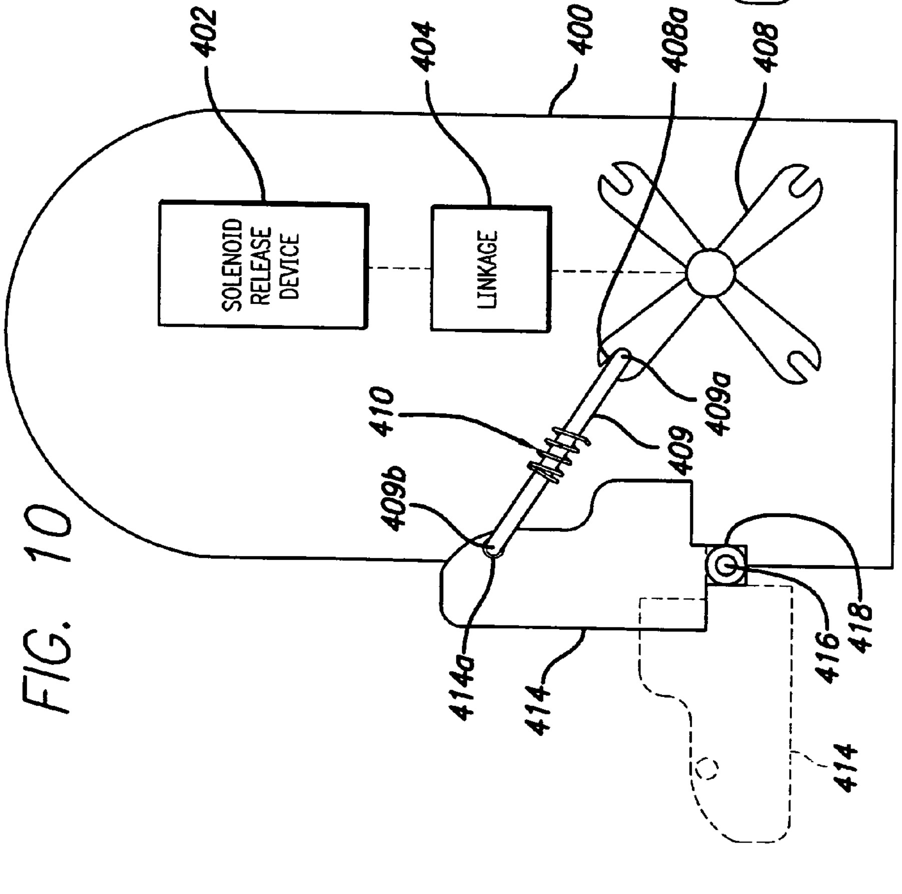
FIG. 10 is a partial schematic partial perspective view of a missile or smart bomb with its fins locked in a retracted position.

FIGS. 10 and 11 show a bomb or missile or torpedo (or an airborne device) with fins retracted before the solenoid is activated and thus locked in that position (FIG. 10) and fins deployed after the solenoid is actuated and thus unlocked (FIG. 11). Such device has a housing 400 and incorporates a solenoid release device 402 such as disclosed in the other embodiments herein. There is a mechanical linkage 404 to the locked member, e.g., member 22 in FIG. 1. A star-shaped member 408 has grooved ends 408*a* which in turn prevent member 409 from moving, e.g., about a pivot point due to e.g., a torsion spring 410. When the solenoid is actuated, star member 408 is pulled upward through linkage 404 or otherwise moved out of engagement with member 409 at its end 409*a*, and spring 410 rotates end 409*b* out of engagement with fin 414, which is then deployed due to a bias outward and around a pivot point 416 connected to the fin at flange 418. In this manner, all four fins are deployed at the same time.

Figure 12:
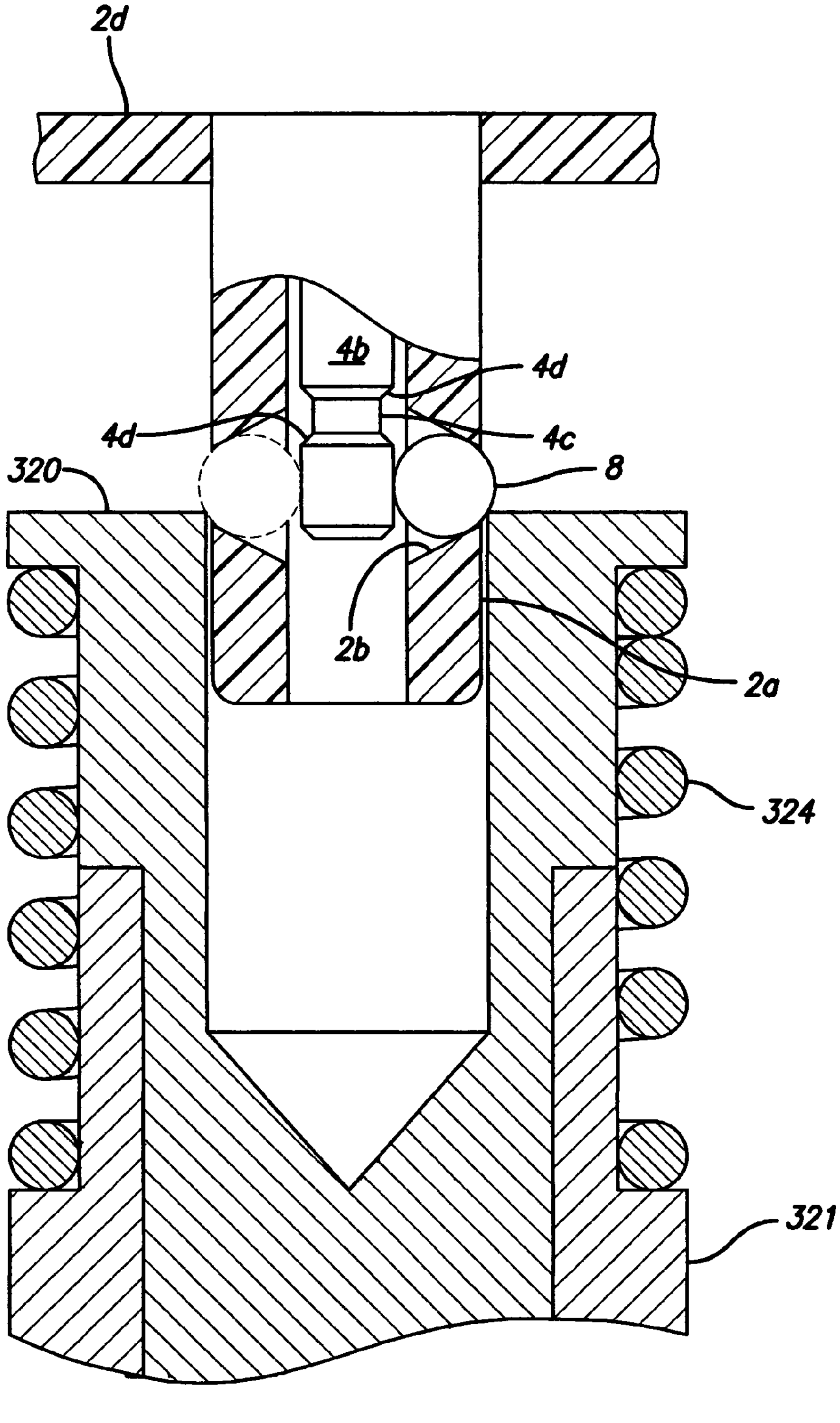
FIG. 12 is an enlarged sectional partial cutaway view of a locking device in a locked position in accordance with a fifth embodiment of the invention.
Figure 13:
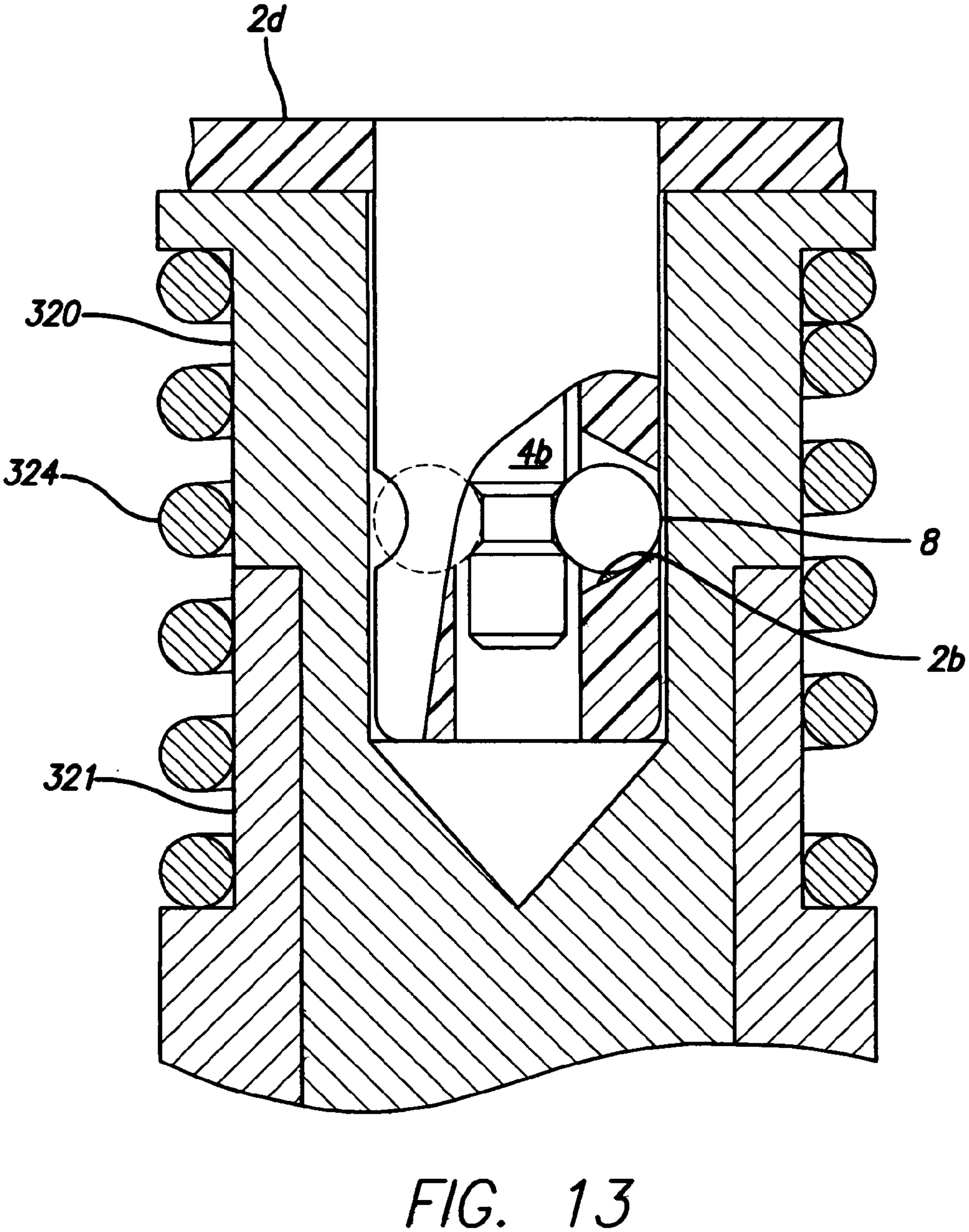
FIG. 13 is a view similar to FIG. 12, but in a released position.

FIGS. 12 and 13 show an enlarged partial cutaway partial sectional view of another embodiment of the locking device in the locked position and released position, respectively. In this embodiment, as in others, like elements are given like reference numerals. This embodiment is similar to that of FIGS. 1 and 2, except that locked member 320 is locked against upward motion under the bias of spring 324, and stopper element 321 is shown to limit the downward motion of member 320 when being reset to the locked position.

Also in FIGS. 12 and 13, one locking ball 8 is shown in phantom to indicate that one or two balls 8 may be used, two being preferred for balance.

By way of example, a recess formed in locked member 320 may be about or less than one half inch, e.g., about three tenths of an inch, in diameter and the diameter of the bottom of the housing may be about one quarter of an inch. The force of spring 10, and thus the solenoid specifications, may be readily determined knowing the biasing force of biasing device 324, and setting the specifications (e.g., materials and dimensions) of the locking balls, plunger, and recesses to hold the locked member 320 against the force of biasing device 324. In a preferred embodiment, as noted above, the force of spring 10 may be, e.g., on the order of ounces and thus the solenoid need only counteract this very small force in relation to the large force of the biasing member 324.

Fin deployment may be tested by actuating the solenoid. The fins may be reset, usually done manually with the aid of a tool or tools to overcome the biasing forces on the fins and other portions of the linkage. For example, once the member 20 in FIGS. 1 and 2 is moved back to the position of FIG. 1, the force of biasing member 10 causes the plunger to move up and the balls 8 to move outward to the locking position, completing resetting of the device. The device is then ready for repeated use.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A bomb, missile or torpedo comprising:

a) a bomb housing having a head and tail;

b) fins proximate the tail;

c) a member disposed in a first position to hold the fins in a retracted position, and moveable to a second position where the fins are released and thereby deployed;

d) a locking device which maintains the member in the first position, and resettably releases the member in response to actuation, the locking device including:

e) a locking device housing;

f) a plunger axially slidable within the locking device housing, at least a first portion of the plunger being made of a magnetically responsive material;

g) a biasing member which urges the plunger in a first direction;

h) one or more primary locking balls;

i) a solenoid coil disposed around at least the magnetically responsive portion of the plunger; and j) each primary locking ball being disposed in an aperture in the locking device housing, the plunger having a second portion thereof containing at least one recess which receives each primary locking ball, the member to be locked being held in the first position with the plunger in a first locking position and each primary locking ball in a radially outward position out of alignment with the recess, wherein in response to actuation of the solenoid, the plunger moves against the biasing member to align the recess with each primary locking ball, so that each primary locking ball moves into the recess in the plunger thereby releasing the locked member, and deploying the fins.

2. The bombs, missile or torpedo of claim 1, wherein the biasing member exerts no more than about one pound on the plunger.

3. The bomb, missile or torpedo of claim 1, further comprising a biasing device for biasing the locked member to move from a first position in which it is held by each primary locking ball, to a second position when released by each primary locking ball, so as to deploy the fins, and wherein the primary locking balls are adapted for holding the locked member against a force of at least about 150 pounds.

4. The bomb, missile or torpedo of claim 1, wherein the first portion of the plunger is generally cylindrical and the second portion is generally cylindrical and in which the at least one recess is formed, the second portion having a smaller diameter than the first portion.

5. The bomb, missile or torpedo of claim 1, wherein the locked member has a recess formed therein, and at least a portion of the locking device housing and plunger, and each primary locking ball, are disposed in the recess of the locked member.

6. The bomb, missile or torpedo of claim 1, wherein the recess in the plunger has beveled portions and each aperture in the locking device housing is beveled.

7. The bomb, missile or torpedo of claim 1 wherein the plunger comprises a release element to manually actuate the plunger within the locking device housing and move the locking ball into the recess in the plunger to release the locked member.

8. The bomb, missile or torpedo of claim 1 wherein the bomb, missile or torpedo comprises an activation circuit electrically coupled to the solenoid coil, the activation circuit providing power to the solenoid coil to actuate the plunger within the locking device housing.

9. The bomb, missile or torpedo of claim 8 wherein the activation circuit comprises a power source and a switch electrically coupled to the solenoid coil, the power source and the switch transmitting power to the solenoid coil to actuate the plunger within the locking device housing.

10. An airborne device comprising:

a) a housing;

b) a first member disposed in a retracted position and movable to a deployed position for use;

c) a second member in a locked position holding the first member in the retracted position, and movable to a release position for deploying the first member;

d) a locking device which maintains the second member in the locked position, and which resettably releases the second member in response to actuation, the locking device including:

e) a locking device housing;

f) a plunger axially slidable within the locking device housing at least a first portion of the plunger being made of a magnetically responsive material;

g) a biasing member which urges the plunger in a first direction;

h) one or more primary locking balls;

i) a solenoid coil disposed around the magnetically responsive portion of the plunger;

j) each primary locking ball being disposed in an aperture in the locking device housing, the plunger having a second portion thereof containing at least one recess which receives each primary locking ball, the member to be locked being held in the first position with the plunger in a first locking position and each primary locking ball in a radially outward position out of alignment with the recess, wherein in response to actuation of the solenoid, the plunger moves against the biasing member to align the recess with each primary locking ball, so that each primary locking ball moves into the recess in the plunger thereby releasing the locked member, and moving the second member to the release position thereby deploying the first member.

11. The airborne device of claim 10, wherein the biasing member exerts no more than about one pound on the plunger.

12. The airborne device of claim 10, further comprising a biasing device for biasing the second member into the release position, wherein the biasing device exerts at least about 150 pounds on the second member.

13. The airborne device of claim 10, wherein the first portion of the plunger is generally cylindrical and the second portion is generally cylindrical and in which the at least one recess is formed, the second portion having a smaller diameter than the first portion.

14. The airborne device of claim 10, wherein the recess in the plunger has beveled portions and each aperture in the locking device housing is beveled.

15. The airborne device of claim 10, further comprising one or more secondary locking balls, each secondary locking ball being disposed in a further recess in the locking device housing, in a position for holding the locked member in place after each primary locking ball has moved into the recess in the plunger, and wherein the locked member is further released when each secondary locking ball moves into at least one further recess in the plunger, so that the second member can move to the release position, thereby deploying the first member.

16. The airborne device of claim 11, further comprising a biasing device for biasing the second member into the release position, wherein the biasing device exerts at least about 150 pounds on the second member.

17. The locking device of claim 1 wherein the plunger comprises a release element configured to allow manual actuation of the plunger within the housing.

18. The locking device of claim 1 wherein:

the solenoid coil comprises a first solenoid coil and a second solenoid coil;

the one or more locking balls comprises a first set of locking balls and a second set of locking balls, the first set of locking balls disposed in a first aperture in the housing and the second set of locking balls disposed in a second aperture in the housing; and the second portion of the plunger defining a first recess to receive the first set of locking balls and a second recess to receive the second set of locking balls, the first solenoid coil actuating the plunger to align the first recess with the first set of balls and allow the first set of balls to move into the first recess in the plunger and the second solenoid coil actuating the plunger, subsequent to actuation by the first solenoid coil, to align the second recess with the second set of balls and allow the second set balls to move into the second recess in the plunger to release the locked member.

19. The airborne device of claim 10 wherein the plunger comprises a release element to manually actuate the plunger within the locking device housing and move the locking ball into the recess in the plunger to release the locked member.

20. The airborne device of claim 10 wherein the airborne device comprises an activation circuit electrically coupled to the solenoid coil, the activation circuit providing power to the solenoid coil to actuate the plunger within the locking device housing.

21. The airborne device of claim 20 wherein the activation circuit comprises a power source and a switch electrically coupled to the solenoid coil, the power source and the switch transmitting power to the solenoid coil to actuate the plunger within the locking device housing.

* * * * *

UNITED STATES PATENT AND TRADEMARK OFFICE

CERTIFICATE OF CORRECTION

PATENT NO. : 6,948,685 B2

DATED : September 27, 2005

INVENTOR(S) : Dana D. Hawthorne

It is certified that error appears in the above-identified patent and that said Letters Patent is hereby corrected as shown below:

<u>Column 8,</u>
Lines 31-33, should be deleted.
Lines 34-51, should be deleted.

Signed and Sealed this

Twenty-fourth Day of January, 2006

JON W. DUDAS

*Director of the United States Patent and Trademark Office*

UNITED STATES PATENT AND TRADEMARK OFFICE

CERTIFICATE OF CORRECTION

PATENT NO. : 6,948,685 B2
DATED : September 27, 2005
INVENTOR(S) : Dana D. Hawthorne It is certified that error appears in the above-identified patent and that said Letters Patent is hereby corrected as shown below:

<u>Column 8,</u>
Lines 31-33, should be deleted.
Lines 34-51, should be deleted.

Signed and Sealed this

Seventh Day of February, 2006

JON W. DUDAS
*Director of the United States Patent and Trademark Office*